(12) United States Patent
Cheng

(10) Patent No.: US 7,515,432 B2
(45) Date of Patent: Apr. 7, 2009

(54) DIGITAL VIDEO RECORDER WITH A FAST-DETACHING HARD DISK ASSEMBLY

(76) Inventor: Yi-Jen Cheng, 9F, No. 21, Sec. 2, Chorngder 2 Rd., Taichung (TW)

(*) Notice: Subject to any disclaimer, the term of this patent is extended or adjusted under 35 U.S.C. 154(b) by 79 days.

(21) Appl. No.: 11/882,299

(22) Filed: Jul. 31, 2007

(65) Prior Publication Data

US 2009/0034212 A1    Feb. 5, 2009

(51) Int. Cl.
*H05K 5/00* (2006.01)
(52) U.S. Cl. .............. 361/752; 361/756; 361/727; 361/715
(58) Field of Classification Search .............. 361/752, 361/790, 797, 800, 756, 727, 683, 686, 715, 361/755, 807, 810
See application file for complete search history.

(56) References Cited

U.S. PATENT DOCUMENTS

| | | | | |
|---|---|---|---|---|
| 5,833,491 A | * | 11/1998 | Suzuki | 439/500 |
| 6,059,589 A | * | 5/2000 | Nishioka | 439/159 |
| 6,597,567 B2 | * | 7/2003 | Stone et al. | 361/683 |
| 6,678,165 B2 | * | 1/2004 | Kawada et al. | 361/753 |
| 7,215,506 B2 | * | 5/2007 | Albrecht et al. | 360/97.01 |

* cited by examiner

*Primary Examiner*—Hung S Bui
(74) *Attorney, Agent, or Firm*—Muncy, Geissler, Olds & Lowe, PLLC

(57) ABSTRACT

A digital video recorder with a fast-detaching hard disk assembly has case, an ejector frame and a hard disk. The case has an opening and cover corresponding to the opening. The ejector frame has a hard disk housing, two X-frames, and is raiseably mounted in the case corresponding to the opening. The hard disk is mounted on the hard disk housing. To remove the hard disk from the case, a person removes the cover and the hard disk housing will automatically raise through the opening for easy replacement, removal or maintenance access.

5 Claims, 7 Drawing Sheets

DIGITAL VIDEO RECORDER WITH A FAST-DETACHING HARD DISK ASSEMBLY

BACKGROUND OF THE INVENTION

1. Field of Invention

The present invention relates to a digital video recorder (DVR), and more particularly to a DVR having an internal hard disk that is detachably mounted on a fast-detaching assembly, wherein the internal hard disk can be easily removed from the fast-detaching assembly of the DVR.

2. Description of the Related Art

Digital video recorders (DVR) using videotapes are rapidly diminishing and are being replaced by DVRs with an embedded hard disk. DVRs with an internal hard disk are widely used for receiving audio-video signals from video cameras, video monitors, television cable.

However, the internal hard disk may need to be removed from the DVR for maintenance, data transmission and especially for replacement with another hard disk. Unfortunately, removal of the internal hard disk from a conventional DVR is troublesome because a person needs to remove many screws to remove a cover of the DVR before removing the internal hard disk, which disuades people from investing in this technology.

The present invention provides a digital video recorder with a fast-detaching hard disk assembly to obviate or mitigate the shortcomings of the conventional DVR.

SUMMARY OF THE INVENTION

The primary objective of the present invention is to provide a digital video recorder (DVR) with a fast detaching hard disk assembly that is allows for easy replacement, removal or maintenance access to the hard disk.

The DVR with a fast-detaching hard disk assembly in accordance with the present invention comprises a case, an ejector frame and a hard disk. The case has an opening and a cover corresponded to the opening. The ejector frame has a hard disk housing, two X-frames and a resilient device and is mounted corresponding to the opening. The hard disk housing is removably mounted in the case. Each X-frame comprises a pair of extending arms mounted on the hard disk housing and the case. The resilient device is mounted between the case and the hard disk housing. The hard disk is mounted on the hard disk housing.

To remove the hard disk from the case, a person removes the cover and the hard disk housing will automatically raise through the opening for easy replacement, removal or maintenance access.

Other objectives, advantages and novel features of the invention will become more apparent from the following detailed description when taken in conjunction with the accompanying drawings.

DETAILED DESCRIPTION OF THE INVENTION

Figure 1:
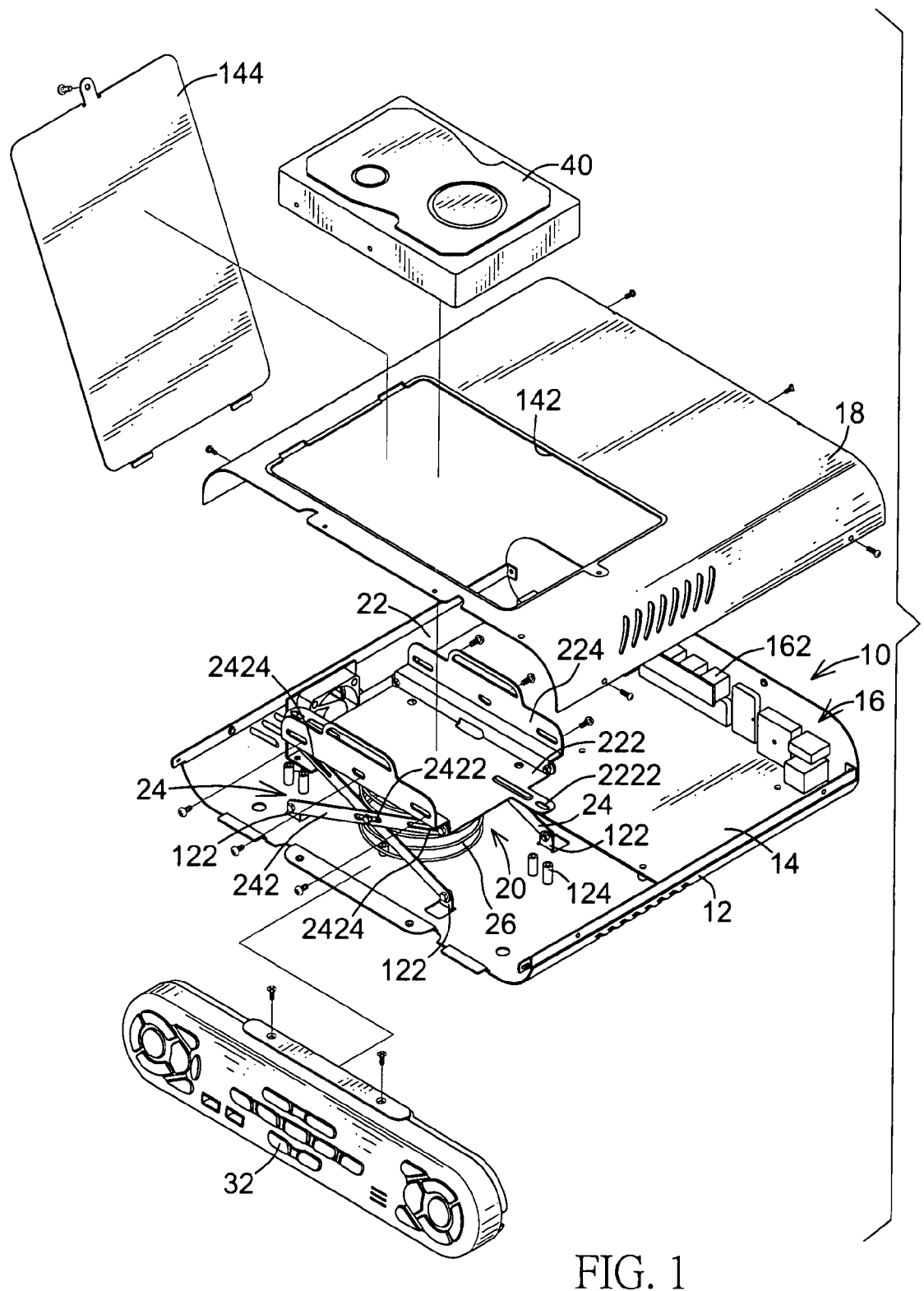
FIG. 1 is an exploded perspective view of a first embodiment of a digital video recorder (DVR) with a fast-detaching hard disk assembly in accordance with the present invention.
Figure 2:
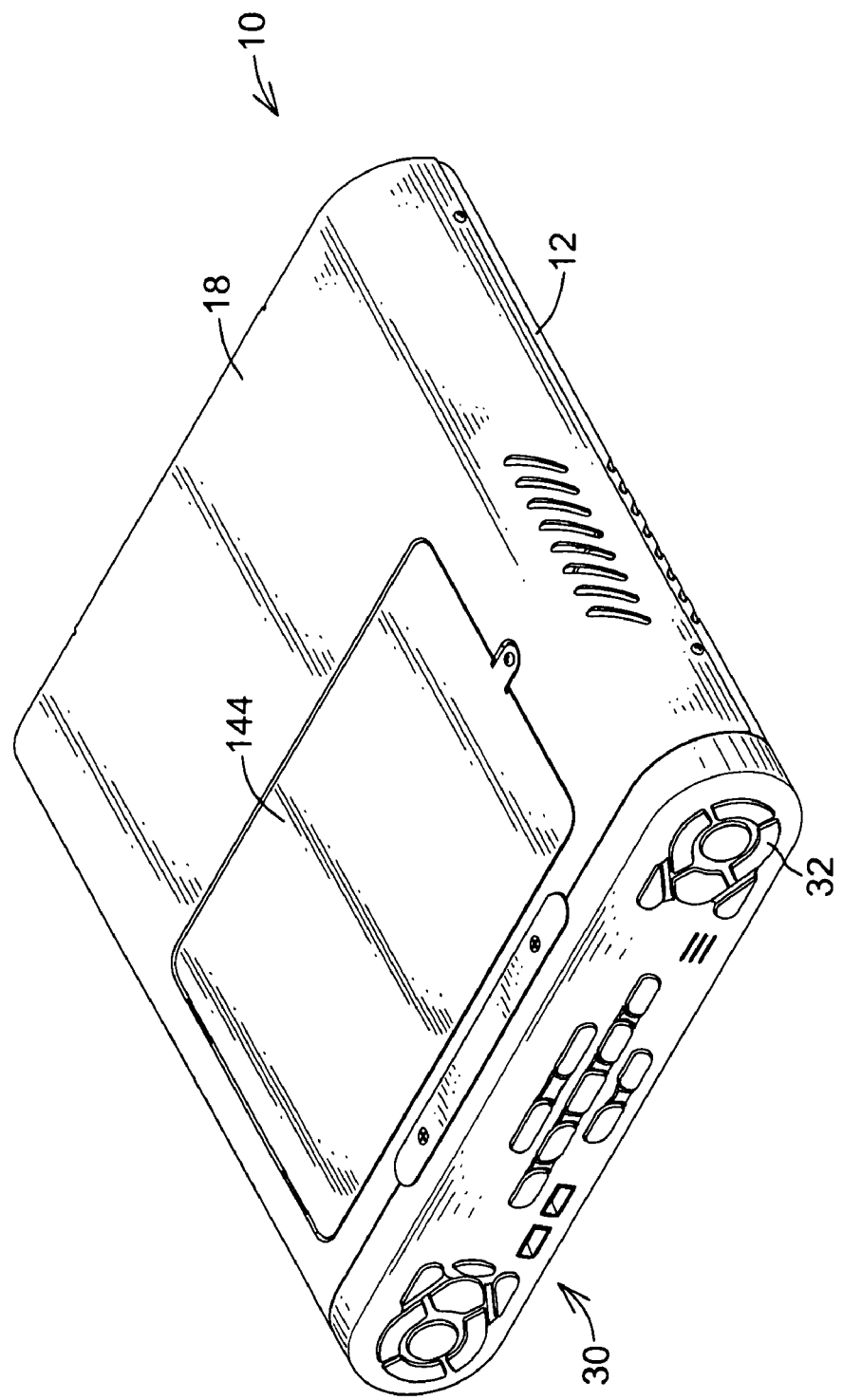
FIG. 2 is a perspective view of the DVR with a fast-detaching hard disk assembly in FIG. 1.
Figure 7:
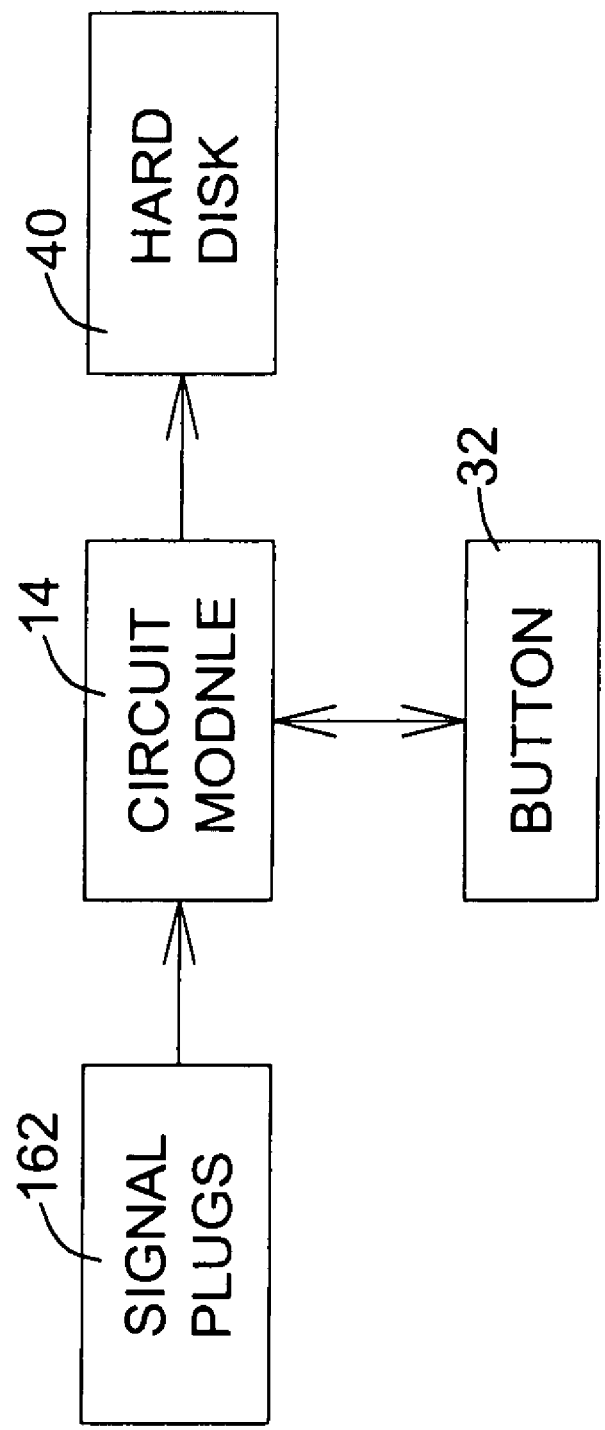
FIG. 7 is a block diagram of the DVR with a fast-detaching hard disk assembly in FIG. 2.

With reference to FIGS. 1, 2 and 7, a digital video recorder (DVR) with a fast-detaching hard disk assembly in accordance with the present invention comprises a case (10), an ejector frame (20), a front panel (30) and a hard disk (40).

The case (10) may be an parallelepiped comprising a base, a base cover (18) corresponding to the base and a rear panel and has a chamber being defined between the base and the base cover (18), a bottom inner surface (12), a front, a top, a circuit module (14), multiple signal plugs (162), an opening (142) and a cover (144).

The bottom inner surface (12) has four ejector frame mounts (122) and may have multiple fastener mounts (124) The ejector frame mounts (122) protrude from the bottom inner surface (12). The fastener mounts (124) protrude from the bottom inner surface (12).

The circuit module (14) is a DVR electric module and is mounted in the chamber of the case (10).

The signal plugs (162) are mounted on the case (10), may be in the rear panel, and are connected electrically to the circuit module (14), may be AV terminals, S terminals or the like, and are used for connecting to and receiving data from an external audio-visual sources, such as video cameras, television or cable signals.

The opening (142) may be larger than the hard disk (40), is formed through the top of the case (10) and may be through the base cover (18).

The cover (144) corresponds to and removably covers the opening (142).

Figure 4:
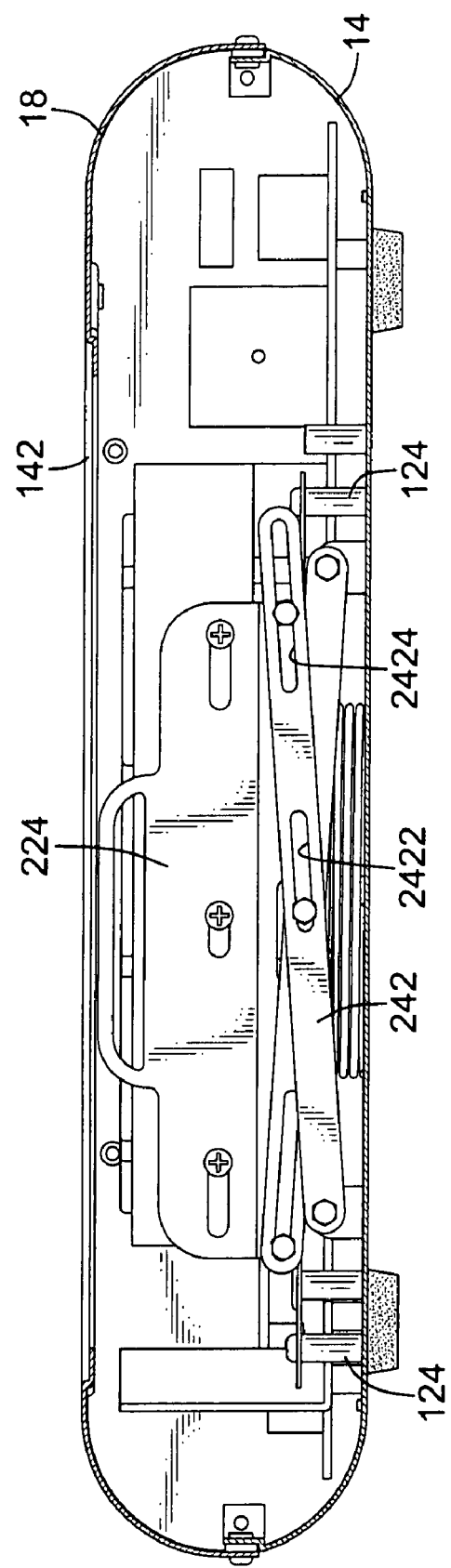
FIG. 4 is a side view in partial section of the DVR with a fast-detaching hard disk assembly in FIG. 2.
Figure 5:
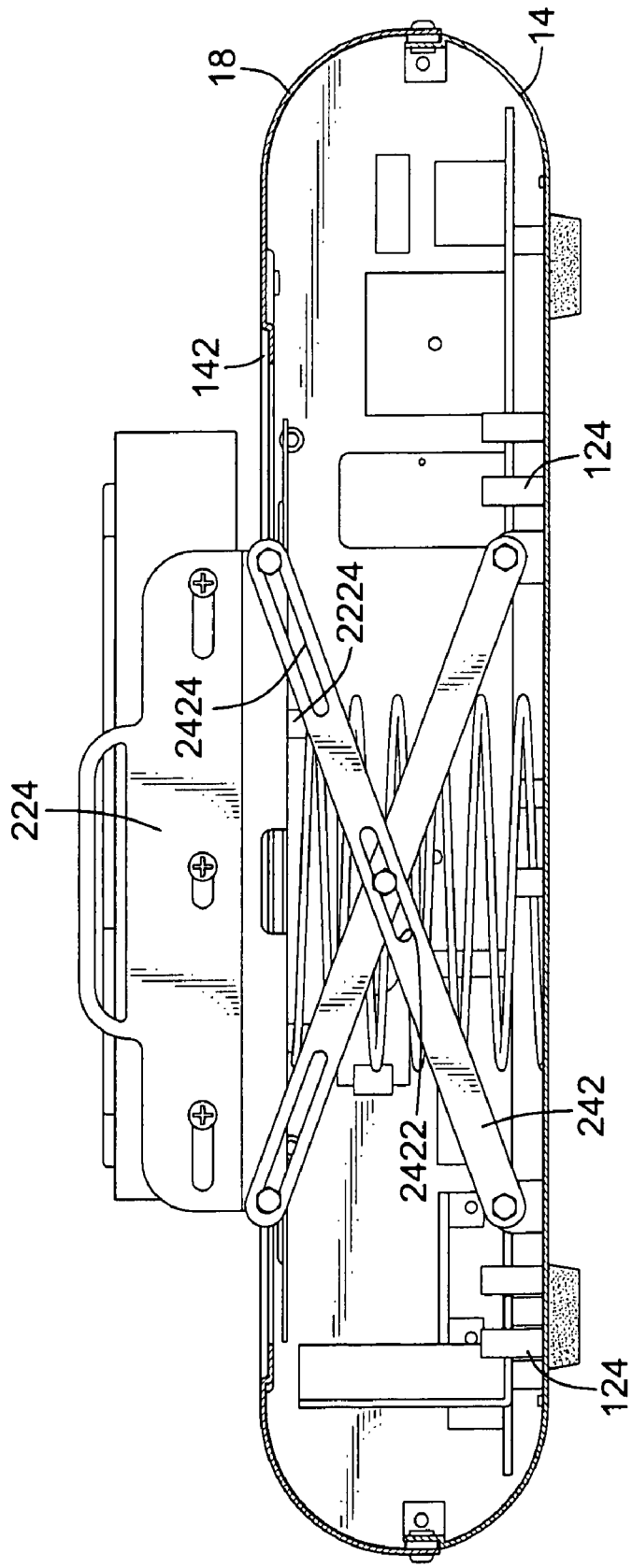
FIG. 5 is an operational side view in partial section view of the DVR with a fast-detaching hard disk assembly in FIG. 4.

With further reference to FIGS. 4 and 5, the ejector frame (20) is mounted raiseably on the bottom inner surface (12) corresponds to the opening (142), and has a hard disk housing (22), two X-frames (24) and at least one resilient device (26).

The hard disk housing (22) may be smaller than the opening (142), and has a bottom panel (222) and may have two side mounts (224). The bottom panel (222) corresponds to a computer hard disk and has two side edges, a bottom, multiple optional fastening holes (2222) and multiple optional spring mounts (2224).

The fastening holes (2222) are formed transversely in the bottom panel (222) corresponding to and selectively engaging the fastener mounts (124) to hold the hard disk housing (22) in the bottom inner surface (12).

The spring mounts (2224) protrude separately from the bottom of the bottom panel (222) toward the bottom inner surface (12).

The side mounts (224) protrude respectively from the side edges of the bottom panel (222) away from the bottom inner surface (12).

The X-frames (24) are pivotally mounted respectively on the side edges of the bottom panel (222) may be on the side mounts (224), and each has a pair of extension arms (242). Each extension arm (242) has a proximal end, a distal end and a sliding slot (2424). One of the each pair of extension arms (242) has a longitudinal slot (2422) formed centrally through the extension arm (242), whilst the other extension arm (242) has a guiding protrusion formed on the extension arm (242) and corresponding to the longitudinal slot (2422).

The proximal end of the extension arm (242) is mounted pivotally on the corresponding ejector frame mount (122).

The sliding slot (2424) is formed longitudinally in the distal end of each extension arm (242). The sliding slots (2424) of the extension arms (242) are mounted slidably on the corresponding side edge of the bottom panel (222) and may be slidably mounted around the corresponding side mounts (224) of the hard disk housing (22).

Figure 3:
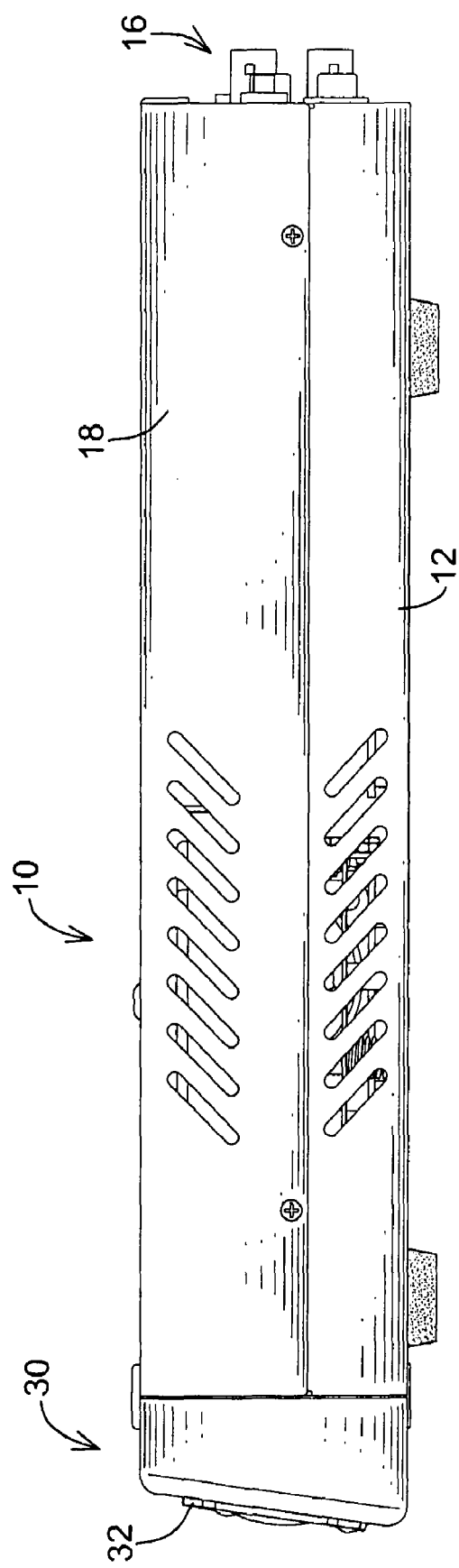
FIG. 3 is a side view of the DVR with a fast-detaching hard disk assembly in FIG. 2.

The resilient device (26) may be a spring, and is mounted between the bottom inner surface (12) and the bottom panel (222). The resilient device (26) may have a through hole. The through hole of the resilient device (26) is mounted around the spring mounts (2224) on the bottom panel (222). With further reference to FIG. 3, the front panel (30) is mounted on the front of the case (10), and has multiple buttons (32) being connected to and controlling the circuit module (14).

The hard disk (40) is mounted removably on the hard disk housing (22) and connected electrically to the circuit module (14) and records an external digital audio-visual signal.

Figure 6:
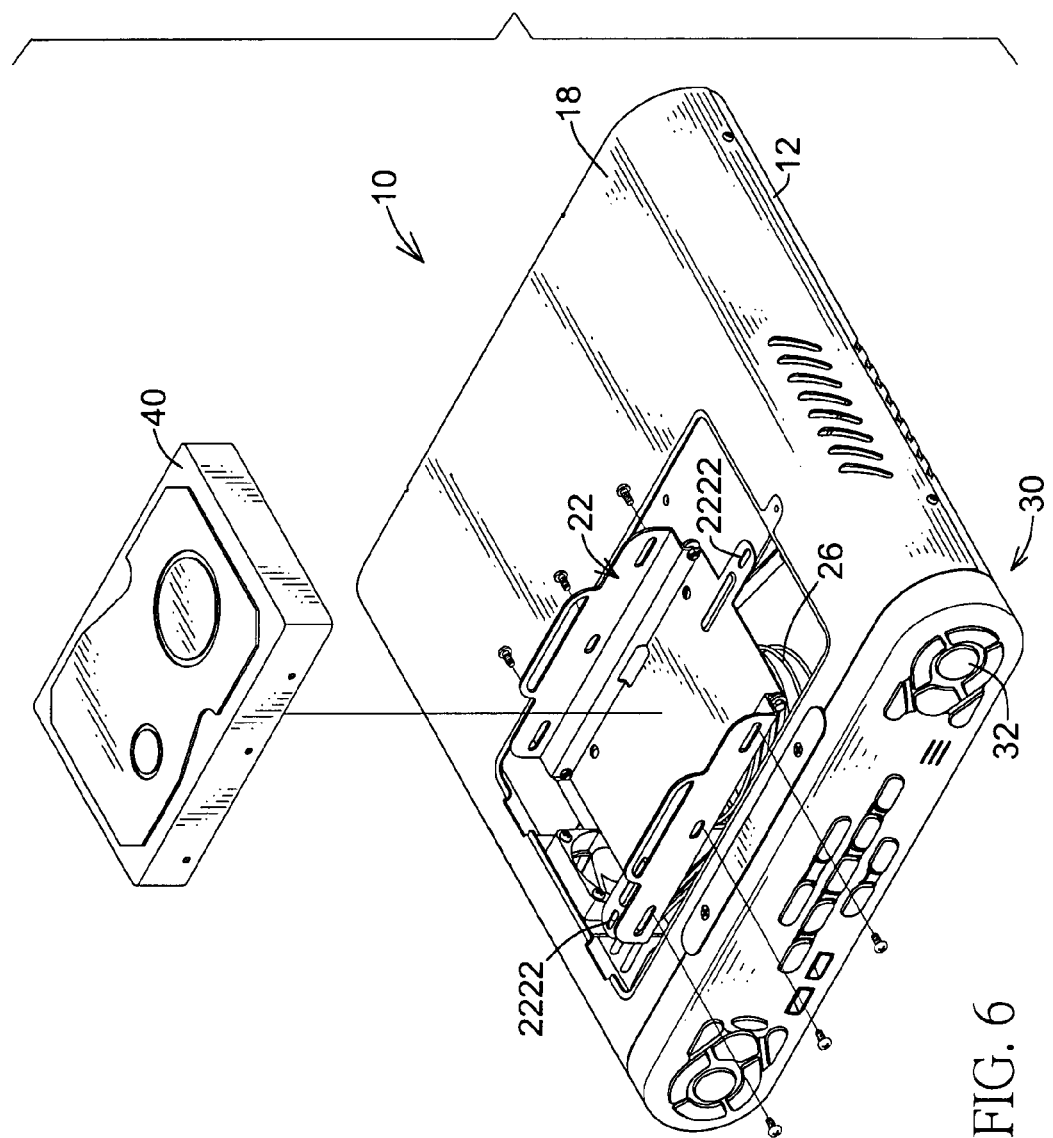
FIG. 6 is a partially exploded view of the DVR with a fast-detaching hard disk assembly in FIG. 2.

With further reference to FIG. 6, to remove the hard disk (40) from the case (10) of the DVR, they only need to open the hard disk cover (144) and release the fastening holes (2222) from the fastener mounts (124), so the resilient device (26) will push the hard disk housing (22) up for easy removal of the hard disk (40) from the hard disk housing (22).

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. A digital video recorder (DVR) with a fast-detaching hard disk assembly comprising
   a case having
      a chamber;
      a bottom inner surface having four ejector frame mounts protruding from the bottom inner surface;
      a front;
      a top;
      a circuit module being a DVR electric module and being mounted in the chamber of the case;
      multiple signal plugs being mounted on the case and connected electrically to the circuit module;
      an opening being formed through the top of the case; and
      a cover corresponding to and removably covering the opening;
   an ejector frame being mounted raiseably on the bottom inner surface corresponding to the opening and having
      a hard disk housing corresponding to the opening and having a bottom panel having two side edges;
      two X-frames being pivotally mounted respectively on the bottom panel and each having
         a pair of extension arms, each extension arm having
            a proximal end being mounted pivotally on one of the ejector frame mounts;
            a distal end;
            a sliding slot being formed longitudinally in the distal end of the extension arm and being mounted slidably on one of the edges of the bottom panel;
         wherein, one of the each pair of extension arms has a longitudinal slot being formed centrally through the extension arm, and the other extension arm of the pair of extension arms has a guiding protrusion mounted slidably in the longitudinal slot; and
      at least one resilient device being mounted between the base and the bottom panel;
   a front panel being mounted on the front of the case, and having multiple buttons being electrically connected to and controlling the circuit module; and
   a hard disk being mounted removably on the hard disk housing and connected electrically to the circuit module.

2. The DVR with a fast-detaching hard disk assembly as claimed in claim 1, wherein
   the bottom inner surface has multiple fastener mounts protruding up from the top surface of the base;
   the hard disk housing further has
      two side mounts protruding respectively from the side edges of the bottom panel away from the bottom inner surface;
      multiple fastening holes being formed transversely in the bottom panel and corresponding to and selectively engaging with the fastener mounts; and
      multiple spring mounts being protruding separately from the bottom panel toward the bottom inner surface; and
   the sliding slots of the extension arms are mounted respectively around the side mounts.

3. The DVR with a fast-detaching hard disk assembly as claimed in claim 2, wherein the resilient device is a spring having a through hole mounted around the spring mounts on the bottom panel.

4. The DVR with a fast-detaching hard disk assembly as claimed in claim 3, wherein the case is parallelepiped and comprises
   a base;
   a base cover corresponding to the base and defining the camber with the base; and
   a rear panel.

5. The DVR with a fast-detaching hard disk assembly as claimed in claim 4, wherein
   the hard disk housing is smaller than the opening;
   the opening is formed transversely on the base cover and is larger than the hard disk; and
   the multiple signal plugs are formed on the rear panel of the case to receive data from an external audio-visual sources.

* * * * *